Aug. 18, 1970   A. ALVAREZ-CALDERON   3,524,610
LEADING EDGE FLAP OF VARIABLE CAMBER AND THICKNESS
Filed Feb. 5, 1968   2 Sheets-Sheet 1

INVENTOR.
ALBERTO ALVAREZ-CALDERON

INVENTOR.
ALBERTO ALVAREZ-CALDERON

United States Patent Office 3,524,610
Patented Aug. 18, 1970

3,524,610
LEADING EDGE FLAP OF VARIABLE CAMBER AND THICKNESS
Alberto Alvarez-Calderon, Avenida Salaverry 3465, Orrantia del Mar, Lima, Peru
Continuation-in-part of applications Ser. No. 187,903, Apr. 16, 1962, and Ser. No. 471,274, July 12, 1965, which is a continuation-in-part of application Ser. No. 337,879, Jan. 15, 1964. This application Feb. 5, 1968, Ser. No. 703,118
Int. Cl. B64c *3/50, 9/26*
U.S. Cl. 244—42                                           23 Claims

ABSTRACT OF THE DISCLOSURE

This invention pertains to leading edge flap for aircraft wings. It specifies a new type of varibale camber flap articulated with respect to the wing by a generally spanwise axis. The flap has a folding nose portion which is stored inside the wing on top of the retracted flap for high speed flight; the molding nose portion is rotated relative to the flap to increase the camber, thickness and chord of the flap for slow speed flight. The new type of flap is exemplified in single and double slotted installations.

CROSS-REFERENCES OF RELATED APPLICATIONS

This patent application is a continuation in part of my copending application Ser. No. 187,903 filed Apr. 16, 1962, now Pat. No. 3,375,998; and of my co-pending application Ser. No. 471,274 filed July 12, 1965, now Pat. No. 3,371,888, which was in turn a continuation in part of my patent application Ser. No. 337,879 filed Jan. 15, 1964, now Pat. No. 3,246,335.

BRIEF SUMMARY OF THE INVENTION

High lift leading edge devices for wings have been known since the early days of aviation. The recent emphasis on the use of thin wings for high speed aircraft, and the use of powerful trailing edge flaps with Boundary layer control, has created special problems of flow separation and deterioration at leading edge of wings at large lift coefficients. As a result of these problems, numerous high lift leading edge devices are now needed and used in aircraft.

These leading edge high lift devices can be aerodynamically grouped into two categories: One is the unslotted camber-changing structures at the leading edge of the wing, for instance the well known "Kruger" flap and the droop leading edges. These high lift devices are discussed in the book "Theory of Wing Sections" by I. H. Abbot and A. E. Von Doenhoff, page 230, published by Dever Publications, Inc. These types of structure improve the shape of the airfoil for high lift flows but do not provide reenergizing of the flow or of the boundary layer on the wing. As is well known the Kruger flap is one of the simplest of the unslotted leading edges devices. It consists in a spanwise pivoted door in the leading edge of the wing and is mechanically similar to the well known trailing edge split flap. From the aerodynamic aspect the Kruger flap increases the lift coefficient and angle of attack of thin wings by values smaller than those that could be obtained with slotted leading edge flaps of an appropriate shape.

For the case of medium thick wings, the effects of the Kruger flap are not large and may be even detrimental. The Kruger type of flap is commonly used in the thin wings of some high speed jet aircraft to obtain some improvement in lift because of its mechanical simplicity and also because it permits a smooth uninterrupted upper surface for the wing.

A second group of leading edge devices are those which not only provide for a camber increase in the wing, but also provide for flow and boundary layer reenergizing by means of a spanwise slot at its forward position. One such device called a slat is shown in Fig. 141, page 236 of the aforementioned reference.

The slotted leading edge devices which increase the wings camber, because of its flow reenergizing feature, provide a larger increment of lift coefficient and angle of attack than those possible with unslotted camber increasing leading edge devices. The feature of flow reenergizing is specially important at large absolute magnitudes of lift coefficients, for in this condition the induced upwash at the leading edge of the wing is large. This condition would exist, for example, in the case of a trailing edge flap with boundary layer control, an STOL airplane, or a tilt wing VTOL airplane. Large localized angles of attack would also favor the use of a slotted leading edge device.

However, the mechanical complexities of slotted leading edge devices which retract smoothly to the wing's surface for high speed flight are serious. Usually it is required that the slat, unlike the pivoted Kruger flap, should translate forward and downwards as well as rotate downwards. Additionally, even in the best arrangements proposed so far, for slotted leading edge devices, in the slat retracted position there exists a surface interruption in the upper surface of the wing which increases drag at high speed. This interruption is important since it precipitates a turbulent boundary layer in the upper wing surface and it also offers a localized drag increment for typical construction methods.

It is therefore evident that the slotted leading edge flaps or slats as proposed so far have structural complications and drag disadvantages which in many cases have greater weight than their special high lift advantages. It is evident that a superior mechanical leading edge device would be one which would combine the structural and mechanical advantages of the Kruger type of flap (a simple pivotal connection, no translation on tracks and no interruptions of the skin in the upper wing surface for high speed) with the aerodynamic advantages of a slotted leading edge flap or slat. (Flow and boundary layer reenergizing at the wing's leading edge to produce greater lifts and range of angles of attack.)

I have invented such a leading edge structure which combines the aerodynamic and structural advantages of each of the types of leading edge devices in unique cooperation between the wing and the device. In addition, my slotted leading edge flap is superior because there is no abrupt change of slope on the wing's upper surface like that present in wings with slats at the wing location corresponding to the trailing edge of the retracted slat.

Moreover, my improved slotted high lift leading edge device can have a cross-sectional shape substantially independent from the cross shape of the upper leading edge portion of the basic airfoil. This characteristic makes it superior for thin high speed airfoils since its shape need not conform to that of the thin wing leading edge as is usually the case with conventional slats. For thicker wings, this also permits one to select the basic wing camber for cruising conditions but yet retain a leading edge flap cross-shape of large curvature suitable for very high lifts.

It is one purpose of this invention to provide structure for a superior pivoted slotted leading edge flap which retracts into the lower forward portion of the wing.

Yet another purpose of the invention is to provide such a structure in which the curvature and leading edge radius of the flap is greater than those of the wing.

Another object of this invention is to provide a slotted pivoted leading edge device which can be incorporated easily into existing aircraft without serious modification of their existing wing structure.

Yet one more object of this invention is to provide a slotted leading edge flap structure in which the pivotal connection between the wing and the flap falls within the airfoil's contour.

One more object of the invention is to provide a structure for a double-slotted leading edge pivoted flap of superior aerodynamic characteristics.

Yet one more object of the invention is to provide a retractable pivoted flap which when extended increases the effective curvature of the wing leading edge proper.

It is another purpose of this invention to provide a leading edge structure of variable chord, camber and thickness, as shown in FIG. 3 wherein a flap is shown folded inside a wing for high speed flight, and unfolded for high lift flight in FIG. 4.

These and other objects and features of the invention will be more readily apparent from a perusal of the description of the embodiments of the structures illustrated in the accompanying drawings.

DETAILED DESCRIPTION

Figure 1:
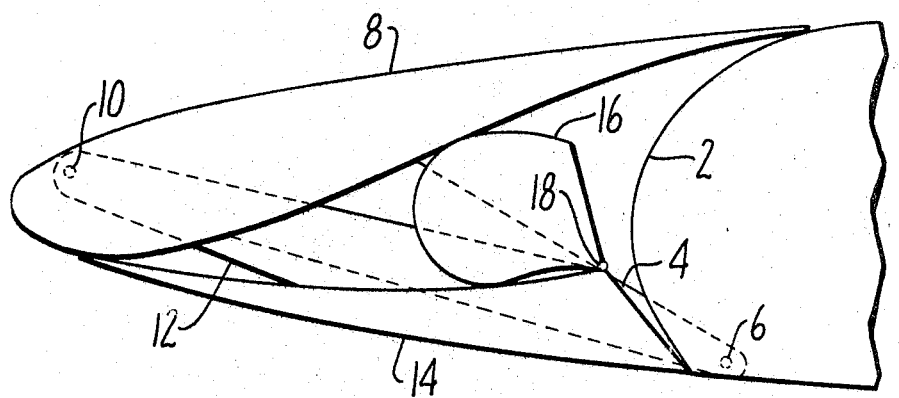
FIG. 1 shows a cross-sectional view of my retracted pivoted double slotted leading edge flap installed in the forward lower portion of a wing; the lower flap has a folded nose portion housed inside the wing contour. The wing upper surface has a separate pivoted flap.

FIG. 1 shows in the high speed configuration the fixed edge portion 2 of a thin airfoil which supports by means of bracket 4 hinged at pivot axis 6 a first leading edge flap 8 fixed to bracket 4. Flap 8 defines the upper surface of the thin airfoil's contour.

Flap 8 supports at pivot axis 10 by means of bracket 12 a second leading edge flap 14 which defines the lower leading edge surface of wing 2; leading edge 14 has an articulated nose 16 which appears retracted in FIG. 1 rotated about pivot axis 18. The entire flap combination permits maximum utilization of the volume inside the thin nose of the airfoil.

Figure 2:
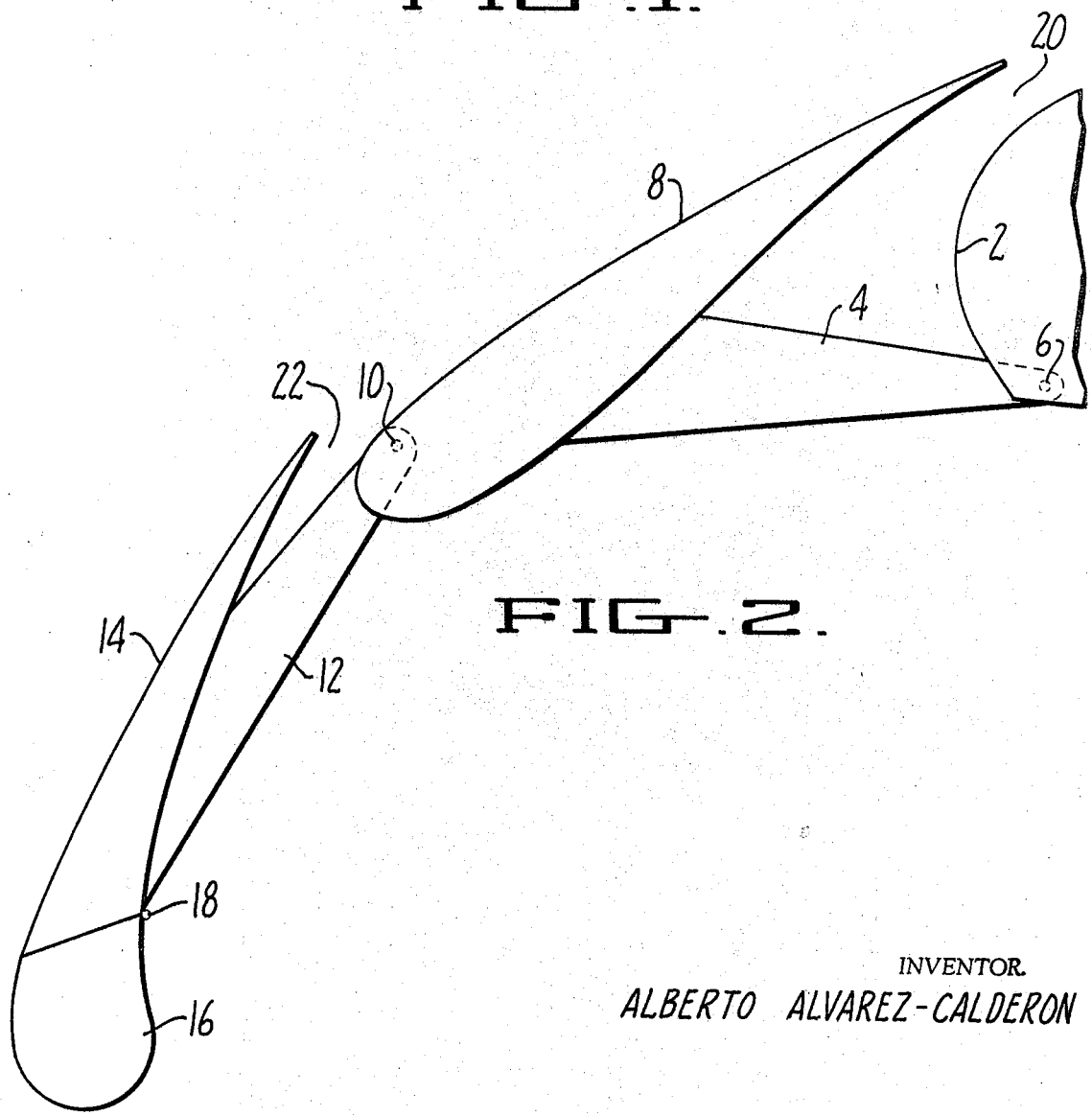
FIG. 2 shows the structure of FIG. 1 in the high lift position with the nose portion of the lower flap unfolded.

The same structure in the high lift position is shown in FIG. 2 in which flap 8 and wing 2 define a first high lift slot 20, and flap 14 and flap 8 define a second high lift slot 22. Rounded portion 16 is positioned to increase the chord and camber of flap 14.

It is seen that flap 14 is upstream of flap 8 and inclined to wing 2 by a large angle which is illustrated to be of the order of 70° to wing 2; flap 8 is upstream of wing 2 and inclined to it by about 30°. These positions and orientations increase the camber and chord of wing 2 and provide flow reenergizing high lift slots. It is seen in FIG. 2 that nose 16 is shown of relatively large size. Its maximum chord measured from pivot 18 to its down face is 1.1 inches and, by inspection of the drawings, this is over one fourth of the chord of flap 14, which is 3.25 inches distance. The depth of flap 14 and nose 18 together, if measured as a perpendicular distance from a reference flap chord tangent to the thin edge of flap 14 and tangent to the rear facing surface of nose 16, to the forward face of flap 14, would be 0.85 inch, which is over one quarter of the chord of flap 14.

Figure 3:
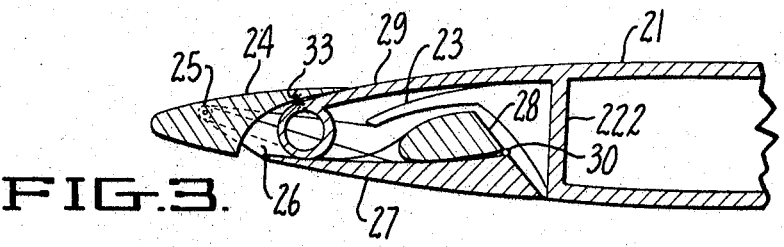
FIG. 3 shows a similar cross-sectional view of my flap design in the retracted position incorporated in a very thin wing and in combination with a fixed upper wing surface.

FIG. 3 shows a wing 21 supporting by means of forwardly protruding bracket 23 a fixed leading edge portion 24. At 24 there is mounted by bracket 26 a lower pivoted flap door 27 having an articulated edge 28 pivoted at axis 30. Plate 27 pushes upward flexible skin member 29 against compression spring 33 to provide a smooth upper surface between 24 and 21. Elements 24 and 29 may be recessed to receive compressed spring 33 if necessary. Of importance in FIG. 3 are:

(a) Small volume occupied by flap forward of spar 222, which small volume is obtained by folding portion 28 by about 180 degrees relative to 27.

(b) Cooperation of plate 27 to bias upwards skin 29 without a special skin actuator.

(c) Absence of movable door to fair plate 27 smoothly to undersurface of wing.

Figure 4:
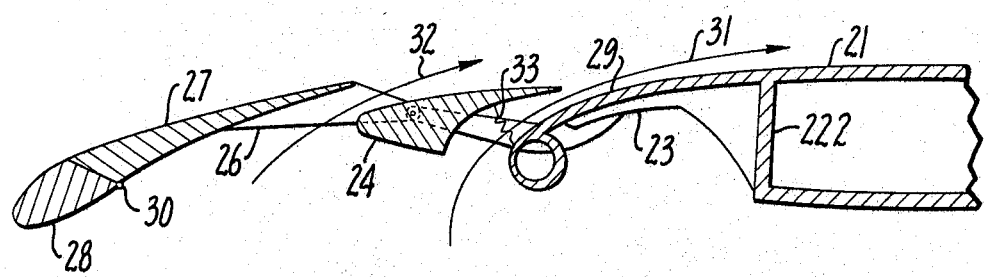
FIG. 4 shows the structure of FIG. 3 in the high lift chord extending position.

FIG. 3 shows the device in high speed flight. For high lift, plate 27 is rotated clockwise by about 160 degrees, portion 28 is rotated clockwise by about 180 degrees and spring 33 pushes skin 29 downward against bracket 23. As a result, we have the structure of FIG. 4 in which there is noted:

(a) A first slot between 29 and 24 for high lift flow 31.

(b) A second slot between 27 and 24 for high lift flow 32.

Figure 5:
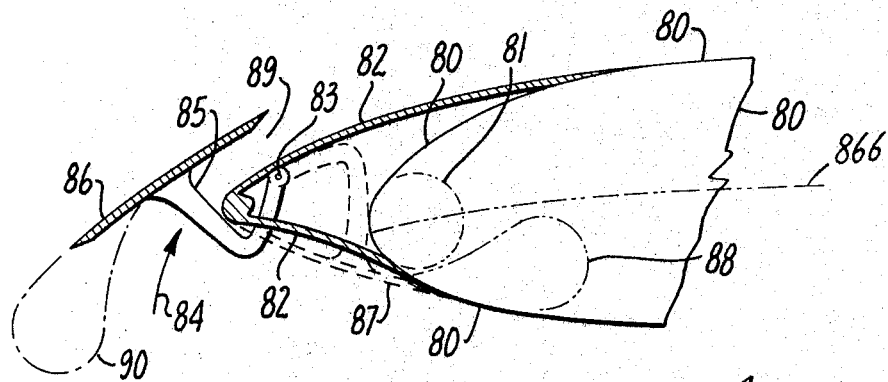
FIG. 5 shows a cross-sectional view of my pivoted leading edge flap installed as a high speed modification for an existing wing whereby the camber and leading edge size of the existing wing are reduced. Yet high lift is improved with the device.

(c) A large camber and chord for combined elements 27 and 28 into a single efficient leading edge slot. It is seen by inspection of FIG. 4 that chord of 28, at 0.75 inch is greater than approximately one third of the chord of 27. Also it is seen that the combined chords of 28 and 27, at 2.52 inches in FIG. 4, would not fit in FIG. 5 between the aft undersurface edge of wing nose element 24 and wing spar 22. In FIG. 5 that distance is 2.2 inches and requires the folding of 28 with respect to 27 shown in the figure.

In FIG. 5, I show the installation of my device as a modification on a wing whereby a new airfoil section of reduced camber and leading edge radius is obtained. These reductions are useful for near sonic speed of flight as they increase the cruise mach number and the mach number of drag rise, and reduce adverse compressibility effects; therefore, the modifications are specially adaptable for existing high speed jet transports and the like. As can be seen, however, the high lift slow speed characteristics are also improved. Specifically, FIG. 5 shows a conventional wing 80 having a large leading edge radius shown by means of circle 81 and a large camber line 866. To the wing 80, there is added, as a modification, a leading edge glove 82 which supports at spanwise pivotal axis 83, a slotted high lift leading edge flap 86 by means of flap brackets 85. The flap is shown extended in high lift position forming a slot 89 for high energy air 84. The flap is retracted by angular motion to high speed position 87, wherein it forms the lower surface of the modification glove for high speed flight.

As an alternate modification, there is shown in FIG. 5, an alternate cross-shape 90 of the flap 86, which, when retracted, would fall inside the wing 80 at position 88. This obviously would require a special recession on wing 80.

Figure 6:
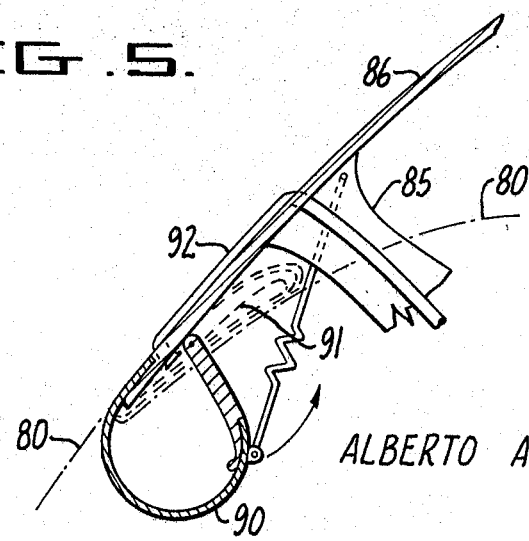
FIG. 6 is an auxiliary figure showing the flap of FIG. 5, incorporating a collapsible flap leading edge tube.

To avoid this special recession in an existing wing but retain a large radius on the leading edge, the latter is made collapsible as shown in greater detail in FIG. 6.

FIG. 6 shows a portion of flap 86 and bracket 85 supporting a collapsible inflatable spanwise boot 90 which can be inflated by gas tube 92 for high lift and collapsed for high speed by releasing the gas pressure and subsequent action of a spring or similar device which moves boot to position 91. The relative position of the retracted flap to the wing's unmodified undersurface is illustrated by the latter's relative location shown as dash dot lines 80.

The aerodynamic shapes and proportions of FIG. 6 are evident in the figure, in which the chord of the flap's nose portion from its articulation pivot to its opposite leading edge portion, at 1.2 inches, is 0.316 of the chord of flap portion 86, which is 3.8 inches. Hence the chord of the nose portion is approximately ⅓ that of the flap portion. Also, when a reference line is passed tangent to the flaps thin edge and the lower part of the nose portion, the maximum camber depth from the reference camber line to the flap portion is 1 inch, which is 0.263 of the length of the flap portion.

The inflatable membrane may be constructed by any known means for inflatable boots—for instance, according to U.S. Pat. 2,934,288.

It should be observed from the structure of FIGS. 5 and 6, that the leading edge radius and camber of the modified wing has been decreased with the glove, but yet, my new high lift slotted leading edge device has been incorporated to improve the high lift characteristics above those of the original wing. Thus, the device acts to improve both the high speed and slow speed regimes of the aircraft.

There are other variations and modifications of the structures of my high lift slotted flap. For instance, the leading edge flap may be connected by a four-bar linkage instead of a simple pivotal connection or the flap may be located between a fuselage and a nacelle and hinged to them directly and not to the wing structure.

A large effiicent boundary layer control device may be installed in the leading edge of the flap which yet will retract completely inside the wing for high speed flight.

This invention pertains to the field of aerodynamics and teaches how to construct and shape the flaps, how to locate them relative to each other, where to articulate the flaps on the wings, and how to use them for high lift flight and high speed flight. The specific form of manipulation of the flaps is a mechanical aspect which can be done according to methods known in the art. For example flaps 8 and 14 of FIGS. 1 and 2 may utilize the mechanism shown in a structurally similiar but aerodynamically different single slotted flap structure of FIG. 5 of my U.S. Pat. 3,128,966, and the 180-degree rotation of element 28 of flap 27 in FIGS. 3 and 4 may be done by means of a crown gear and worm system mounted on airfoil element 27, for example as shown in FIG. 7 of my U.S. Pat. 3,126,173 wherein flap element 64 can rotate 180 degrees with respect to airfoil element 60, to position 69.

Various modifications can be made without departing from the spirit of the invention. The structure is applicable to tail surfaces, ailerons, hydrofoils, and other fluid-sustained vehicles.

I claim:

1. A primary airfoil having a leading edge portion, a lower and an upper surface; a secondary airfoil having a principal portion connected by a spanwise articulation on said primary airfoil adjacent to said leading edge portion with said principal portion of secondary airfoil having a spanwise edge adjacent to said leading edge portion of said primary airfoil, said secondary airfoil having an auxiliary portion having a rounded spanwise edge with said auxiliary portion articulated on said principal portion, with said secondary airfoil being adapted to be moved from a retracted high speed disposition in which said principal portion of said secondary member is to the rear of said leading edge portion below said upper surface and smoothly faired to said undersurface with said auxiliary portion of said secondary airfoil folded, with respect to said principal portion, towards said spanwise edge of said principal portion on top of said principal portion and between said upper surface and said principal portion, to an extended disposition in which said principal portion of said secondary airfoil is inverted about said spanwise articulation to a high lift position forward and below a part of said leading edge portion, said auxiliary portion being located below said principal portion increasing the camber, area and leading edge thickness of said secondary airfoil.

2. The structure of claim 1 further characterized in that the downstream surface of the principal portion of said secondary airfoil adjacent said spanwise edge is in said extended disposition spaced from the leading edge portion of said primary airfoil to define converging slot walls therebetween for fluid flow upwardly through said slot.

3. The structure of claim 1 further characterized in that said leading edge portion and a portion of said upper surface of said primary airfoil comprises a third airfoil movably mounted on said primary airfoil.

4. The structure of claim 3 further characterized in that said secondary airfoil is mounted on said third airfoil.

5. The structure of claim 3 in which first slot wall means are provided between said third airfoil and said primary airfoil.

6. The structure of claim 5 in which second slot wall means are provided between said primary and secondary airfoils when said secondary airfoil is in said extended disposition.

7. The structure of claim 1 further characterized in that said auxiliary portion of said secondary airfoil comprises a panel member pivotally connected to said primary portion for movement towards and away said spanwise edge, with a flexible surface membrane connected between said principal portion and said panel member.

8. The structure of claim 1 characterized further in that said secondary airfoil has a substantial variation of chord by virtue of the folding relationship of said auxilary portion which, in said high speed disposition of said secondary airfoil, is placed in a chord-reducing relationship in which said auxiliary portion being folded on top of said principal portion, overlaps a chordal length portion of said principal portion no less than one quarter of the chord length of said principal portion, with the total chordwise dimension of the secondary airfoil in said high speed disposition being no greater than substantially the chord of said principal portion of said secondary airfoil.

9. The structure of claim 8 characterized further in that said primary airfoil has a front spar member, and that said front spar member, by reason of said chord-reducing relationship of said folded auxiliary portion which significantly reduces the chordwise length portion on said primary airfoil which said secondary airfoil occupies in said high speed disposition adjacent said leading edge, has a forwardly spar location on said primary airfoil at a distance with respect to said spanwise edge of said principal portion in said high speed disposition, no greater than substantially the said chord length of said principal portion; with the magnitude of the chordwise distance between said leading edge of said primary airfoil and the forwardly facing elements of said wing spar, being less than the sum of the magnitude of the overall chordwise length of said principal portion plus the overall chordwise length of said auxiliary portion.

10. The structure of claim 1 characterized further in that when said secondary airfoil is in said extended disposition said principal portion has a chord length from said spanwise edge to a second edge approximately parallel to said spanwise edge and adjacent to said articulation of said auxiliary portion; in that said auxiliary portion has a chordal length extending from a region of said auxiliary portion which is adjacent to said articulation of said auxiliary portion, to a region of said auxiliary portion which is remote from said articulation of said auxiliary portion; in that said auxiliary portion in said high speed disposition by reason of said folded relationship cooperates to reduce the overall chord of said secondary airfoil; and in that said auxiliary portion when unfolded cooperates to increase significantly and substantially the camber, area and leading edge thickness of said secondary airfoil in said extended disposition with said chordal length of said auxiliary portion being at least as great as approximately one third of said chord length of said principal portion.

11. The structure of claim 10, further characterized in that said secondary airfoil in said extended disposition has an upwardly facing surface which is highly cambered relative to a reference plane tangent to said spanwise edge and tangent to but below said auxiliary portion, with the maximum camber depth between said upwardly facing surface and said plane being at least as great as one fourth of the said chord length of said principal portion.

12. The structure of claim 11 further characterized in that the surface portion of said secondary airfoil in said extended disposition which is adjacent to said spanwise edge, is spaced from the leading edge portion of said primary airfoil to define therebetween walls of a high lift slot for upwardly airflow through said slot.

13. The structure of claim 1 further characterized in that the leading edge thickness of said secondary airfoil in said extended disposition is larger than the thickness of said leading edge portion of primary airfoil.

14. The structure of claim 13 further characterized in that the curvature of said secondary airfoil in said extended disposition is greater than the curvature of the portion of said primary airfoil which is adjacent said leading edge portion.

15. The structure of claim 1 characterized further in that said secondary airfoil has variable chord and variable surface area, with said auxiliary portion of said secondary airfoil comprising the variable chord and variable surface area component of said secondary airfoil, said auxiliary portion when unfolded increasing significantly and substantially the surface area of said secondary airfoil with said auxiliary portion having an overall chordal dimension along a chordal plane perpendicular to said primary airfoil, no less than substantially one fourth of the overall chordal dimension, along the said perpendicular plane, of said principal portion; with said folded auxiliary portion in said high speed disposition overlapping said principal portion thereby cooperating to reduce the chord of said secondary airfoil in said high speed disposition to a chord no greater than substantially that of said principal portion; said primary and secondary airfoils being additionally characterized in having substantially different leading edge thickness and curvatures, with said primary airfoil having a reduced leading edge thickness and camber when said secondary airfoil is in said folded high speed disposition; and with said secondary airfoil in said extended disposition having, by virtue of its unfolded auxiliary portion, a leading edge portion with a radius of curvature substantially greater than the radius of curvature of the leading edge portion of said primary airfoil in said high speed disposition, and with the camber of the combined principal and auxiliary portions of said secondary airfoil in said extended disposition being greater than the camber of the leading edge portion of said primary airfoil combined with the upper surface portion of said principal airfoil adjacent to said leading edge portion of said primary airfoil.

16. The structure of claim 1 further characterized in that said principal portion in said extended disposition has a first upwardly facing skin surface and a second downwardly facing skin surface, with said upwardly and downwardly facing skin surfaces being contiguous to each other adjacent to said spanwise edge of said principal portion, and separate from each adjacent the said articulation of the said auxiliary portion; thereby defining a first depth of said principal portion; said auxiliary portion having in said extended disposition a first region of its said rounded spanwise edge adjacent said first skin surface and projecting smoothly downwardly from said first skin surface and defining a leading edge region of said secondary airfoil; with said auxiliary surface having a second region of its said rounded spanwise edge located adjacent to said second skin surface.

17. The structure of claim 16 further characterized in that the camber and leading edge radius of said secondary airfoil is greater than the camber and leading edge radius of said primary airfoil.

18. The structure of claim 17 characterized further in that said first and second regions of said rounded spanwise edge combine smoothly with said first and second skin surfaces of said principal portion to define a highly cambered secondary airfoil shape having substantially continuous but separate upper and lower surfaces, with said airfoil shape having a thickness at least as great as said first depth of said principal portion adjacent said articulation.

19. The structure of claim 1 characterized further in that said principal portion of said secondary airfoil has a chord length between said spanwise edge and said articulation of said auxiliary portion; in that said auxiliary portion has a chordal distance betwen said articulation of said auxiliary portion and the part of said auxiliary portion remote from said articulation of said auxiliary portion; and in that said secondary airfoil has a variable overall chord by reason of the relative size of said auxiliary portion and said principal portion and by virtue of their relative folding motion, with said chordal distance of said auxiliary portion being at least as great as substantially one fourth of said chordal length of said principal portion; with said auxiliary portion when unfolded consequently increasing substantially and significantly the surface length, in a generally chordwise direction, of said secondary airfoil in said extended disposition, and with said auxiliary portion when folded on top of said principal portion in said high speed disposition, consequently reducing substantialy and significantly the overall chord of said primary airfoil in said high speed disposition.

20. The structure of claim 19 further characterized in that in said extended disposition said unfolded auxiliary portion increases substantially and significantly the aerodynamically effective camber and leading edge radius of said secondary airfoil, with camber of said secondary airfoil being greater than the camber of a portion of said upper surface of said primary airfoil which is adjacent to said leading edge, and with the radius of said leading edge of said secondary airfoil in said extended disposition being greater than the leading edge radius of said primary airfoil.

21. The structure of claim 20 further characterized in that said secondary airfoil in said extended disposition has an upwardly facing surface which is highly cambered with respect to a rectilinear reference line passing through said spanwise edge and tangent to but below said unfolded auxiliary portion, with the maximum perpendicular distance between said reference line and said highly cambered upwardly facing surface defining a maximum camber depth of said secondary airfoil being at least as great as one quarter of the chord length of the principal portion of said secondary airfoil in said extended disposition.

22. The structure of claim 1 further characterized in that said auxiliary portion in said high speed disposition is located within said primary airfoil folded with respect to and on top of said principal portion in a relationship of reduced overall chord and efficient volume distribution within said primary airfoil, with the upper part of said folded auxiliary portion being located in close vicinity to a portion of said upper surface of said primary airfoil and away from the elevaton of the portion of said lower surface of said primary airfoil which is adjacent to said principal portion of said auxiliary airfoil in said high speed disposition.

23. The structure of claim 15 further characterized in that said variable area secondary airfoil utilizes a flexible surface member and an articulated curved plate member which in said extended disposition are adapted to cooperate to define a highly cambered secondary airfoil contour of increased camber and overall depth, and in said high speed disposition are adapted to cooperate to define a secondary airfoil contour of reduced camber and overall depth.

References Cited

UNITED STATES PATENTS 3,089,666   5/1963   Quenzler _____ 244—7

MILTON BUCHLER, Primary Examiner

J. L. FORMAN, Assistant Examiner